US008515815B2

(12) United States Patent
Chenot

(10) Patent No.: US 8,515,815 B2
(45) Date of Patent: *Aug. 20, 2013

(54) MANAGEMENT SYSTEM AND METHOD FOR PERSONAL PER-CARD USE SUBACCOUNT TRANSACTION FINANCIAL MANAGEMENT

(76) Inventor: Richard H. Chenot, St. Charles, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,475

(22) Filed: Sep. 11, 2012

(65) Prior Publication Data

US 2013/0013436 A1   Jan. 10, 2013

Related U.S. Application Data

(63) Continuation of application No. 12/498,941, filed on Jul. 7, 2009, now Pat. No. 8,265,998.

(51) Int. Cl.
*G06Q 20/40* (2012.01)

(52) U.S. Cl.
USPC .......... 705/21; 705/16; 705/14.23; 705/26.41

(58) Field of Classification Search
USPC ........ 705/21, 16, 17, 35, 44, 64, 75; 235/380
See application file for complete search history.

(56) References Cited

U.S. PATENT DOCUMENTS

| 4,508,260 | A | 4/1985 | Keir et al. |
|---|---|---|---|
| 5,438,186 | A | 8/1995 | Nair et al. |
| 5,644,727 | A | 7/1997 | Atkins |
| 5,649,118 | A | 7/1997 | Carlisle et al. |
| 5,955,961 | A | 9/1999 | Wallerstein |
| 6,024,286 | A | 2/2000 | Bradley et al. |
| 6,412,205 | B1 | 7/2002 | Cheresko |
| 6,636,833 | B1 | 10/2003 | Flitcroft et al. |
| 6,648,222 | B2 | 11/2003 | McDonald et al. |
| 7,044,394 | B2 | 5/2006 | Brown |

(Continued)

FOREIGN PATENT DOCUMENTS

| EP | 824944 A1 | 2/1998 |
|---|---|---|
| KR | 20010086928 A | 9/2001 |

(Continued)

OTHER PUBLICATIONS

Office Action dated Apr. 1, 2011 from related U.S. Appl. No. 12/498,946.

(Continued)

*Primary Examiner* — Vanel Frenel
(74) *Attorney, Agent, or Firm* — Polster, Lieder, Woodruff & Lucchesi, LC

(57) ABSTRACT

A computer system for processing purchase transaction payments with user oriented personal financial management support having a database with primary accounts each with a plurality of subaccounts each having a subaccount indicator and a user defined funding level, receiving a financial purchase transactions payment request for payment authorization of a financial purchase transaction payment associated with an activity of the user including a financial purchase transaction amount, the primary account number, and a user selected subaccount indicator, verifying the received financial purchase transaction amount is within the received funding level for the subaccount associated with the received user selected subaccount indicator contained within the received payment request in near real time; and transmitting a financial purchase transaction authorization in response in near real time to a positive verification that the received financial purchase transaction amount is within the funding level of the subaccount associated with the received subaccount indicator.

20 Claims, 6 Drawing Sheets

(56) References Cited

U.S. PATENT DOCUMENTS

| | | |
|---|---|---|
| 7,094,394 B2 | 8/2006 | Davies et al. |
| 7,136,835 B1 | 11/2006 | Flitcroft et al. |
| 7,158,955 B2 | 1/2007 | Diveley et al. |
| 7,246,752 B2 | 7/2007 | Brown |
| 7,334,733 B2 | 2/2008 | King et al. |
| 7,380,710 B2 | 6/2008 | Brown |
| 7,472,827 B2 | 1/2009 | Fletcher |
| 7,472,829 B2 | 1/2009 | Brown |
| 7,505,931 B2 | 3/2009 | Da Silva |
| 7,512,566 B1 | 3/2009 | Fellner |
| 7,533,063 B2 | 5/2009 | Kianian |
| 7,543,739 B2 | 6/2009 | Brown et al. |
| 7,567,934 B2 | 7/2009 | Flitcroft et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,631,804 B2 | 12/2009 | Brown |
| 2001/0027994 A1 | 10/2001 | Hayashida |
| 2003/0024995 A1 | 2/2003 | Conner et al. |
| 2003/0097331 A1 | 5/2003 | Cohen |
| 2004/0177045 A1 | 9/2004 | Brown |
| 2006/0287964 A1 | 12/2006 | Brown |
| 2007/0100754 A1 | 5/2007 | Brown |
| 2007/0168265 A1 | 7/2007 | Rosenberger |
| 2008/0046747 A1 | 2/2008 | Brown et al. |
| 2008/0197533 A1 | 8/2008 | Tsao et al. |
| 2008/0228637 A1 | 9/2008 | Scipioni et al. |
| 2008/0228638 A1 | 9/2008 | Scipioni et al. |
| 2008/0235135 A1 | 9/2008 | Blinn et al. |
| 2008/0265018 A1 | 10/2008 | Kemper et al. |
| 2008/0301041 A1 | 12/2008 | Bruk |
| 2008/0314971 A1 | 12/2008 | Faith et al. |
| 2008/0319912 A1 | 12/2008 | Faith et al. |
| 2009/0037333 A1 | 2/2009 | Flitcroft et al. |
| 2009/0070260 A1 | 3/2009 | Flitcroft et al. |
| 2009/0134217 A1 | 5/2009 | Flitcroft et al. |
| 2009/0150271 A1 | 6/2009 | Bishop et al. |
| 2009/0164380 A1 | 6/2009 | Brown |
| 2009/0164381 A1 | 6/2009 | Brown |
| 2009/0187507 A1 | 7/2009 | Brown |
| 2009/0248581 A1 | 10/2009 | Brown |
| 2009/0255996 A1 | 10/2009 | Brown et al. |

FOREIGN PATENT DOCUMENTS

| | | |
|---|---|---|
| KR | 20040040827 A | 5/2004 |
| KR | 20050086789 A | 8/2005 |
| KR | 20080022823 A | 3/2008 |
| KR | 20080052540 A | 6/2008 |
| KR | 20090002050 A | 1/2009 |
| KR | 20090036613 A | 4/2009 |

OTHER PUBLICATIONS

PCT Search Report and Written Opinion from International Application No. PCT/US2010/041193.

Partial machine translation pp. 1-6 of above For. Doc. # 1—KR Pub. No. 20010086928; Sep. 15, 2001; Koo, Hong Sik.

Partial machine translation pp. 1-6 of above For. Doc. #2—KR Publication No. 20080052540; Jun. 11, 2008; Shin Han Bank.

Partial machine translation pp. 1-7 of above For. Doc. #3—KR Pub. No. 20040040827; May 13, 2004; Park, Jung Woong.

Partial machine translation pp. 1-14 of above For. Doc. #4—KR Pub. No. 20080022823; Mar. 12, 2008; Shin Han Bank.

Partial machine translation pp. 1-11 of above For. Doc. #5—KR Pub. No. 20050086789; Aug. 30, 2005; Kulakowski, Henry K.

Partial machine translation of pp. 1-8 of above For. Doc. #6—KR Pub. No. 20090036613; Apr. 15, 2009; Shin Han Bank.

Partial machine translation of pp. 1-13 of above For. Doc. #7—KR Pub. No. 20090002050; Jan. 9, 2009; Shin Han Bank.

Track format of magnetic stripe cards, Luis Visdomine, Jul. 7, 2009, available at: http://www.gae.ucm.es/-padilla/estrawork/tracks.html.

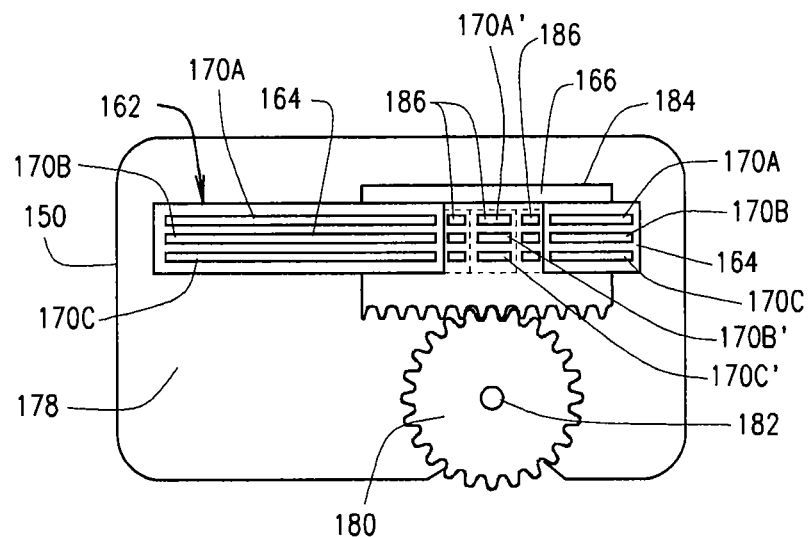
F I G . 5A
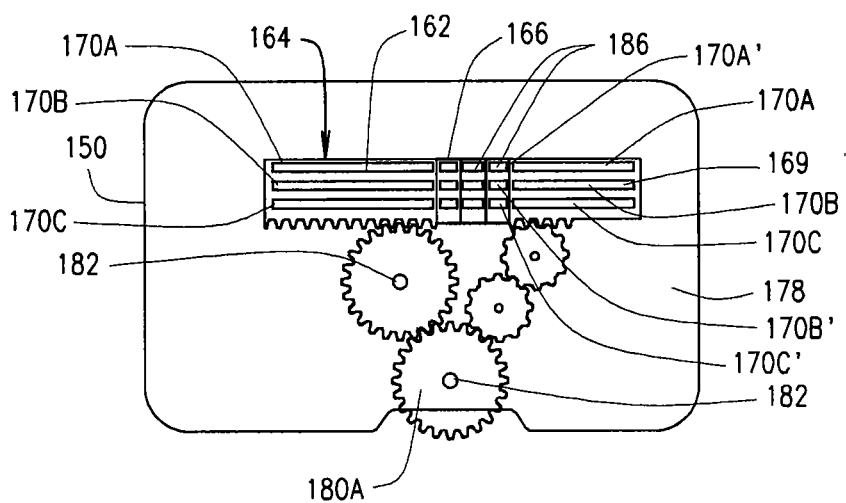
F I G . 5B

MANAGEMENT SYSTEM AND METHOD FOR PERSONAL PER-CARD USE SUBACCOUNT TRANSACTION FINANCIAL MANAGEMENT

CROSS-REFERENCE TO RELATED APPLICATIONS

This application is a continuation of U.S. patent application Ser. No. 12/498,941 (issued as U.S. Pat. No. 8,265,998 on Sep. 11, 2012) and as filed on Jul. 7, 2009.

Additionally, the Applicant notes that there are related companion patent applications including U.S. patent application Ser. No. 12/498,946 filed on Jul. 7, 2009 entitled TRANSACTION PROCESSING SYSTEMS AND METHODS FOR PER-TRANSACTION PERSONAL FINANCIAL MANAGEMENT; and U.S. patent application Ser. No. 12/498,953 filed on Jul. 7, 2009 entitled FINANCIAL CARDS AND METHODS FOR PER-TRANSACTION PERSONAL FINANCIAL MANAGEMENT.

The disclosures of the above applications are incorporated herein by reference.

FIELD

The present disclosure relates to personal financial management and, more specifically, to a financial card-enabled personal financial account management systems and methods.

BACKGROUND

The statements in this section merely provide background information related to the present disclosure and may not constitute prior art.

Financial cards are used by individuals and businesses for the payment of amounts owed for a purchase. These financial cards represent a financial account of that of a user with a financial institution wherein the user has opened an account and has agreed to reimburse the financial institution for transactions where the card is a credit card or the user agrees to prefund the account with a prefunded amount from which the purchases are subtracted where the card is a debit or prepaid card. Each of these cards includes a financial account number that is unique to that particular financial card and that uniquely identify the financial account of that particular user and card. Each financial account and/or financial card can also have an associated security code and/or personal identification number (PIN).

The user of the card presents the financial card either at the time of a purchase for processing using a point of sale transaction terminal that enters the account number and can also include entering the PIN or security code. A similar process is handled via manual input for on-line payment systems or to agents of third parties over the telephone. In this later case, the account number and possibly the PIN and security code are entered by the agent into a similar transaction processing system for providing such information for processing of the payment of a transaction amount. A centralized transaction processing system of the financial institution receives the financial account number and the security code or PIN from the transaction processing entity along with the identification of the payee, authorizes the payment, and arranges for the transfer of the transaction amount from the financial account of the user to the designated account or financial institution of the payee. The transaction amount is either deducted from the prepaid funds of the financial account of a user where the financial account and card are prepaid or debit accounts or is reflected as a credit purchase in the user's account for a credit account that is subsequently billed to the user for payment reimbursement to the user's financial institution.

Generally, these financial cards, the financial account, the transaction processing systems at the point of sale or entry and the transaction processing system of the financial institution are only capable of a single financial account and a single financial account number. As such, the user must manage their purchases and/or prefunding of the debit card account on a total account basis and can only allocate the purchases for personal financial management as a separate process individually. While users often have aided their management through opening of multiple accounts with the same or multiple financial institutions, these require different financial accounts and different financial cards, which is often not desirable to the user.

SUMMARY

The inventor hereof has succeeded at designing systems and methods for financial transactions using a financial card that is capable of enabling the user of a financial card to manage their personal finances through prefunding, budgeting by establishing a funding level, and per-purchase/payment transactions management using a single financial account and a single financial card.

According to one aspect, a financial system for processing financial purchase transaction payments with user oriented personal financial management support having a server having a processor, a network interface, a non-transitory memory and computer executable instructions including a database, and a network interface. The network interface communicatively interfaces with a remote financial purchase transaction processing system over a communication network for receiving a primary account number, a financial purchase transaction amount, and a subaccount indicator. The database includes a plurality of primary accounts each having a plurality of subaccounts each associated with a subaccount indicator and each having a funding level. The system has the computer executable instructions for performing the method having the steps of establishing in the database a primary account for the user having a primary account number for financial purchase transactions and establishing in the database a plurality of subaccounts each with a subaccount indicator within the primary account and having a subaccount funding level for financial purchase transactions. It further performs the steps of receiving a funding level from the user located at a remote financial purchase processing system for each of the subaccounts and indicating in the database the receipt of such funding level in each of the subaccounts of the primary account for financial purchase transactions and receiving over the network interface a financial purchase transactions payment request from the financial purchase transaction processing system for payment authorization of a financial purchase transaction payment associated with an activity of the user associated with the financial purchase transaction processing system, the financial purchase transaction payment request including a financial purchase transaction amount, the primary account number, and a user selected subaccount indicator, wherein the received user selected subaccount indicator in the received payment request is one of the plurality of subaccount indicators associated with one of the plurality of subaccounts within the primary account associated with the received primary account number. The steps are also performed for verifying the received financial purchase transaction amount is within the received funding level for the subaccount associated with the received user selected subaccount indicator contained within the received payment request in near real time; and transmitting over the network interface a financial purchase transaction authorization to the financial purchase transaction processing system in response in near real time to a positive verification that the received financial purchase transaction amount is within the funding level of the subaccount associated with the received subaccount indicator.

According to another aspect is a method of providing personal financial management to a user for making payment towards a purchase using a remotely located financial management system the steps as identified as being implemented in computer executable instructions as identified in the immediately preceded paragraph. This method is limited to a remotely located financial management system having a processor, a network interface, a non-transitory memory and computer executable instructions including a database and for performing the processes.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIGS. 5A, 5B, and 5C are internal views of three embodiments of a financial card for personal financial management having wheel operated user inputs adapted for user manipulation for selecting a particular subaccount for a transaction according to one exemplary embodiment.

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses. Before turning to the figures and the various exemplary embodiments illustrated therein, a detailed overview of various embodiments and aspects is provided for purposes of breadth of scope, context, clarity, and completeness.

As described herein, various embodiments of systems and methods for personal financial management using a financial card include a primary account with a plurality of subaccounts within the primary account. The subaccounts can be established by the financial institution but utilized by the user or owner of the primary account to aid and/or enable the user to personally manage their available funds by selecting a subaccount to apply a particular purchase and payment of a transaction amount. In some embodiments, this can also include prefunding of each subaccount for particular personal financial management purpose such as where applied in a debit card application. For example, a subaccount can be established for any reason that can aid a user of the card in management of their personal financials and in particular their expenditures to which the financial card is used. For example, subaccounts within the primary account can be established for items such as housing, rents, entertainment, food, groceries, restaurants, transportation, gasoline, clothing, children's expenses, home improvements, educational expenses, business expenses, discretionary expenditures, and savings, by ways of example.

The various systems for support of this financial account management system and method include a financial account management system that can be a centralized financial account management processing system of a financial institution which can be a credit card/debit card processing system. The system and method can also include transaction processing systems such as point of sales systems that are located at retail stores or seller vendor locations, or on-line via a web business or payment system for processing purchase payment transactions and payment of transaction amounts within the financial account management system from the user's account to a payees account. Additionally, a user payment device, such as a financial card, can provide not only the primary account number for the primary account of the user, but also can include, in some cases, the capability for the user to select on the financial card a particular subaccount to be used for a particular transaction payment, and then transference of the user selected subaccount indicator to the transaction processing system.

Figure 1:
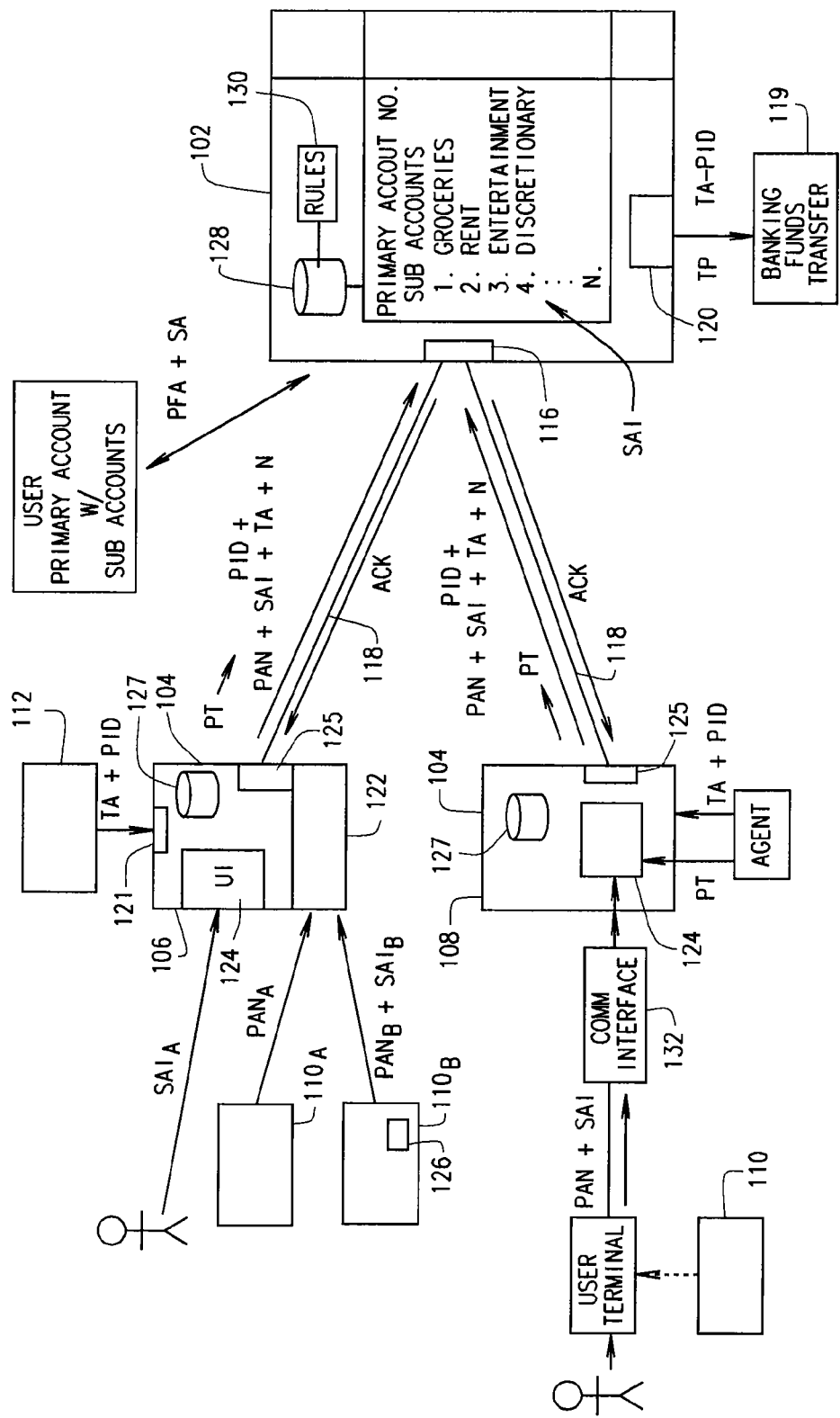
FIG. 1 is a block diagram of a personal financial management system according to one exemplary embodiment.

Referring now to FIG. 1, a personal financial management system 100 having a variety of different modules and components and embodiments is illustrated. As shown, a financial account management system (FAMS) 102 is configured for processing transactions from user selected subaccounts SAs as received from transaction processing systems 104. The FAMS 102 is configured to establish the primary account PA having a primary account number PAN and each having two or more subaccounts SA each of which has a separate subaccount indicator SAI. The subaccount indicator SAI can be any type of alphanumeric indicator and can be of any length. In one embodiment, there can be from 2 up to 10 subaccounts SAs, which can have subaccount indicators SAIs from 0 to 9, if a single subaccount indicator is desirable for system implementation. Additionally, a maximum of 10 subaccounts SAs may be suited for many user applications. However, additional digits in the subaccount indicator can provide for more subaccounts SAs, such as 26 subaccount indicators SAIs if a letter in the alphabet is used or 100 subaccounts SAs if two digits are implemented for the subaccount indicator. The user U provides the FAMS 102 with the identification of the subaccounts SA, possibly a label or category for each, and in some cases a pre-funded amount or other rule or limits to each as will be discussed in greater detail below.

In some embodiments, the financial account management system 102 supports a pre-paid debit card that uses an industry standard card number but with a new personal identification number (PIN) that is segmented into a prefix or suffix for the subaccount indicator (SAI), such as a single digit in one embodiment, a card user created personal identification number PIN, and a subaccount indicator SAI. The subaccount indicator SAI can be a numeric digit inserted by the user in the prefix or suffix field that will logically link the corresponding purchase activity to one of the sub-accounts within the primary account PA. The financial account management system 102 includes programming that enables the financial institution offering the prepaid card service to recognize as valid any of the subaccount indicators SAIs to one of the predefined and prefunded subaccounts SAs. The financial services institution programming can further direct the payment transaction PT to one of the subaccounts SAs based on a digit entered in the prefix/suffix field and received and transmitted by a capable transaction processing system 104.

The payment transactions PT are identified by a subaccount indicator SAI associated with a single primary account number PAN in real time or near real time at the time of processing the payment of each transaction amount TA to a payee (PY) that in many cases originate at a cash register or purchase payment system 112 that transmits the payee identification number PID along with the transaction amount TA to the transaction processing system 104. Each payment transaction PT includes processing each transaction amount TA from the user selected prefunded subaccounts SAs by indicating at the time of each transaction a particular subaccount indicator SAI indicating the particular subaccount SA to be used for that transaction. The personal financial management system 100 can include a transaction processing system 104, 106, 108, which are generically referred to herein as transaction processing system 104, but also specifically referred to as transaction processing system 106 wherein the system is a point of sale transaction system 106 and as a transaction processing system 108 wherein the system in an online processing system such as a webpage or web portal payment system or third party agent on a telephone line that enters such transaction processing information.

A financial card 110 can be any type of financial card such as a debit or prepaid card. The primary financial account PFA typically has one or more financial cards 110 each having the primary account number PAN on the card. However, as described herein, each PA with PAN has associated with it a plurality of user defined and managed subaccounts SAs each having a user defined and user selectable subaccount indictor SAI. The transaction processing systems 104 are configured to connect into a local user purchasing system to receive the transaction amount TA, and then receive from the user the primary account number PAN and the user selected subaccount indicator SAI at the time of purchase.

In some embodiments, the user can establish prepaid amounts or budget for each subaccount SA within the primary account PA and enables the user to designate at the time of a purchase which one of the plurality of subaccounts SAs to utilize for the particular purchase and payment of the associated transaction amount TA to the payee PY. However, as also noted, where a credit card embodiment is utilized, the subaccounts SAs are not necessarily prefunded, but there can be rules or limitations established for each credit card subaccount SA as a way of enabling the user to budget and manage within predefined credit expenditure levels.

The user designation of the subaccount SA can be provided, in one embodiment, by the user entering an additional subaccount indicator SAI, or wherein the user can enter it into a user interface of the financial card that is then input by the card into the transaction processing system 104 at the time of payment. The subaccount indicator SAI can be a digit or code that is separately entered or that is entered at the beginning or end of the user's PIN entry. The user designated subaccount indicator SAI is received by the transaction procession system and transmitted to the financial account management system 102 of the financial institution wherein payment transactions PT are processed. That system 102 manages the payment transactions PT based not only on the primary account PA, but also the subaccount SA within the primary account PA. The financial account management system 102 as addressed above includes subaccounts SAs that, in some embodiments, have had pre-funded or defined spending limits for each subaccount SA. In such embodiments, after the user pre-funds each subaccount SA that can be particular classifications or types of purchases or transactions, the user can designate the particular subaccount SA at the time of a payment transaction PT so as to personally and proactively manage their personal financials within the predefined limits or pre-established rules of the subaccounts SAs thereby enabling the user to not only budget for categories of spending, but also to manage those budgets in real time at the time of each and every transaction, to within limits or budgets for food, clothing, entertainment, gas/transportation, by ways of example. This can be useful, for example, where a third party such as a parent, provides the prefunding for each subaccount SA, whereby, a minor or student is provided a prefunded budget for each particular subaccount SA.

In some embodiments, a financial account management system 102 is configured for processing payment transactions PT from the user's primary account PA and specific subaccounts SA therein to payees PY, as indicated at the time of payment transaction PT by the user that provides the subaccount indicator SAI. The financial account management system 102 typically is located in a centralized location that is communicatively coupled or connectable to remotely located transaction processing systems 104 via network or communication facilities or services. As such, the financial account management system 102 includes a network interface 116 configured for interfacing with multiple transaction processing systems 104 over a variety of suitable communication network links 118. Any suitable protocol can be used and are common in the financial industry to provide secure transmission of financial information. This secure information includes, but is not limited to the identification of the transaction amount TA, the primary account number PAN, the subaccount indicator SAI, the user's name, and a payee identification number PID associated with the account to which the transaction amount should be sent. A database 118 within the FAMS 102 includes a plurality of primary accounts PAs for each of the many users of the financial institution and also includes each of the plurality of subaccounts SAs within each PA, along with each of their unique subaccount indicators SAIs. Wherein the application is a prefunded debit card embodiment, instead of not only providing the primary account PA with a prefunded amount, each of the subaccounts SAs can include prefunded subaccount amounts as prefunded budgets by subaccount for transaction processing of the user's expenditures within each subaccount. The financial account management system FAMS is configured for management and administration of the primary accounts PA and the subaccounts SAs within each primary account PA and their prefunded subaccount levels and transactions to and from such, including payments and transfers.

In these embodiments, the financial account management system 102 manages the funding and transactions in and out of the prefunded subaccounts SAs, and within the entire primary account PA. The system 102 receives payment transactions PT from various transactions processing systems 104 that identify the primary account PA by primary account number PAN and the subaccount SA by the subaccount indicator SAI, for payment of a transaction amount TA to the payee PY via a funds transfer interface 120 to a funds transfer operation or system 119 of the transaction payment TP that includes the transaction amount TA to the payee identification number PID of the party to be paid the transaction amount. To accomplish this, the system 102 processes payment transactions PT with transaction amounts TA from each subaccount SA based on the received primary account number PAN, the received subaccount indicator SAI, the prefunded amount in the subaccount SA associated with the received subaccount indicator SAI and any rules established for the primary account PA or subaccount SA.

As also shown in FIG. 1, in one embodiment the user can utilize financial card 110A for a payment transaction PT. After making a purchase with payee PY, the payee PY completes the payment transaction PT of the transaction amount TA via the user's financial card 110A using a card reader 122 with the transaction processing system 106. The user can then enter the subaccount identifier SAI via a user interface 124 of the transaction processing system 106, either by itself, or in conjunction with the user entering of their PIN in the UI 124. As a second example, the financial card 110B may be configured with a financial card user interface 126 that enables the user to input a selection of a subaccount SA or the subaccount identifier SAI directly on the card 110B. In such embodiments, the user would present the financial card 110B to the card reader 122 wherein the card reader 122 would not only obtain the primary account number PAN, but also automatically obtain the subaccount identifier SAI, such as from the magnetic strip if a debit or credit card, or electronically from a Smart Card.

As described, one or more embodiments of the system as described herein can be utilized for performing a method of providing personal financial management to a user using the financial card 110. One embodiment of such a method includes establishing a primary account PA in the financial account management system 102 for payment of transactions based on a primary account number PAN and a prefunded amount for the primary account PA for a user U, as shown in FIG. 1. In addition to the primary account PA with a primary account number PAN, the user would also establish or create a plurality of subaccounts SAs within the primary account PA with each having a subaccount indicator SAI. Each can also have subaccount prefunded amounts within the prefunded amount of the primary account PA or have rules or limitations, in some cases. The method can also include receiving funding from the user for each of the subaccounts SAs and receiving a payment transaction PT (request for a payment) from the payee or payee purchase payment system 112 requesting payment of a transaction amount TA associated on behalf of the user. The payment transaction PT can include the transaction amount TA, the primary account number PAN, and a user selected subaccount indicator SAI. The user selected subaccount indicator SAI is one of the subaccount indicators SAIs within the primary account PA associated with the received primary account number PAN. The method further includes verifying the availability of funds in the subaccount SA associated with the received subaccount indicator SAI by the FAMS 102. The method includes transmitting a transaction authorization TransAuth to the transaction processing system 104 in response to a positive verification of available funds within the subaccount SA associated with the received subaccount indicator SAI.

When a payment transaction PT is being processed, if the financial account management system 102 determines that there is insufficient funds available for payment of the transaction amount TA from the user selected prefunded subaccount SA, the payment of the transaction amount TA from the primary financial account PA and the subaccount SA can be denied. However, in other embodiments, the financial account management system 102 can be configured to transmit a lack of funds indicator or message back to the transaction processing system 104 from which the payment transaction PT originated and therefore to the user. The user can then be prompted with an indication that insufficient funds are available from the previous selected subaccount SA. Additionally, the prompt or message can also include an indication that funds are available from a different or alternative subaccount $SA_{Alt}$ within the user's primary account PA. The financial account management system 102 can also prompt or transmit a request for the user at the transaction processing system 104 to select an alternative subaccount $SA_{Alt}$ from within the primary account PA rather than denying the processing of the payment transaction payment PT. The user can then reenter an alternative subaccount indicator $SAI_A$ at the transaction processing system 104 that is then retransmitted to the financial account management system 102 for payment processing using the alternative subaccount $SA_A$ within the primary account PA. For instance, the user may have set up a separate subaccount SA for discretionary or overage spending that has a separate subaccount indicator SAI or may choose to utilize a different subaccount SA for that particular transaction to allocate prefunded amounts or limits from one subaccount SA to a second subaccount SA for the particular payment transaction payment PT. The financial account management system 102 can manage and report these back adjustments or transfers to the user in their financial account statements of the primary account PA by listing the subaccounts SA and any issues or transfers related to one or more thereof. In this manner, the user can separately track and manage each subaccount SA within the primary account PA.

In another embodiment, the financial account management system 102 can provide the user the ability to pre-establish subaccount rules or primary account rules that include rules that limit or prearrange for the transfer of funds between subaccounts SAs. This can address both real time user requests for payment transactions PT or can include automatic system generated alternative subaccount transfers or funding based such as when insufficient funds are in a first user selected subaccount SA for a particular payment transaction PT. This can also include limitations on the transfer of funds between subaccounts SAs even though sufficient funds may be available in other subaccounts SAs within the primary account PA, such to protect certain categories of funds, such as prefunded amounts for rent, housing or car payments, such funds being established as nondiscretionary for other use purchases or payment transaction PT. The financial account management system 102 can receive an allocation instruction from the user or a third party of the account, such as a parent or guardian, to form rules that are stored within the memory 128 as rule instructions 130, e.g., software encoded instructions. These rules 130 can include an instruction for the future reallocation of prefunded amounts from a first subaccount $SA_1$ to a second subaccount $SA_2$, both within the same primary account PA with the same primary account number PAN. The financial account management system 102 can also be configured to receive an instruction from the user via the transaction processing system 104 to cause a real-time transfer for the processing of the payment transaction PT of the transaction amount TA. In such cases, a special override code or authorization code can be required to be provided, as provided for by the rule instructions 130 and pre-established by the user. The financial account management system 102 would then verify the availability or validity of such an instruction and the availability of funds and if allowable and there is sufficient prefunded amount in the selected alternative subaccount $SA_4$, the system 102 would process the payment transaction PT from the alternative subaccount $SA_4$.

When operable in an integrated system, the financial account management system 102 can be configured for receiving the primary account PA for specifying a subaccount descriptive label for each of the subaccounts SAs within the primary account PA to aid the user in their personal financial management.

The financial account management system 102 is configured to compare the transaction amount TA with the prefunded amount or predefined credit limit associated with the subaccount SA of the received subaccount indicator SAI and determines the appropriateness of authorizing the payment transaction PT. A verification of available prefunded amounts is then transmitted to the transaction processing system 104 responsive to a successful determination of availability of prefunded amounts or available credit, or a lack of funds indication is transmitted to the transaction processing system 104 responsive to an unsuccessful determination of availability of prefunded amounts or available subaccount credit limit.

The prefunded debit card prefunding process can be supported by programmed logic to distribute or allocate dollar amounts to each of the subaccounts SAs within the primary account PA. Techniques employed to accomplish this prefunding distribution include allocating a percentage of the total to each sub-account or allow for an assignment of specific dollar amounts to each subaccount SA with a countdown feature for the remaining total addition to support the spreading of total dollars added to the subordinate subaccounts SAs. Additionally, as described herein, the system can enable the user to establish transactions rules that address the funding verification, denial or transfer of funds between subaccounts SAs that can be applied in real time during transaction processing. These and other embodiments will be described in more detail.

In some embodiments, the systems and methods can include a financial card 110 for use by the user that is configured specifically to receive user input specifying a particular one of the subaccounts SAs at the time of each purchase that will be used for payment of the particular payment transaction PT. The transaction processing systems 104 and the financial card 110 are configured for automatically transmitting and using the user specified subaccount SA as entered by the user on the financial card 110. Exemplary embodiments of various financial cards and transaction processing systems 104 for use with the financial card 110 will now be explained in more detail. In one embodiment referred to herein as Protect Our Pocket™ personal financial account management system (a trademark of the inventor hereof), a pre-paid debit card can offer a user friendly method to the card holder to access each of one to ten subaccounts SAs within the primary account PA of a single debit card for the purpose of improving personal cash budgeting and management. The transaction processing system 104 that transacts with the financial account management system 102 for processing and approval of each payment transaction PT of the user at the time of use and provide for payment of the transaction amount TA from the user's subaccount SA within the primary account PA to the payee to which the user owes the transaction amount TA.

In some embodiments, the transaction processing system 104 is configured to transmit the transaction amount, the primary account number PAN and the received subaccount indicator SAI to the financial account management system 102. The transaction processing system 104 can be configured for initiating the payment of the transaction amount TA and providing the primary account number PAN to the transaction processing system 104. Such systems, such as point of sale systems 106, or online transaction processing system 108 are typically implemented by a retail seller or on-line seller or system.

The transaction processing system 104 as described herein can also be enabled through new and additional features and capabilities to the transaction processing systems 104, such as point of sale terminal 106 that are located in retail establishments or via on-line payment operators. One embodiment of such a point of sale transaction processing system 106 includes a card reader 122 configured for receiving a primary account number PAN from a debit card 110, a transaction interface 121 for receiving a transaction amount TA, a user interface is configured for receiving a user authorization, a debit card processing module 106 configured for processing of the received debit card information and the user authorization and a network interface 125 configured for communicating with the financial account management system 102 having a plurality of primary accounts PAs including a received primary account with prefunded subaccounts SAs.

The user interface 124 is configured to receive a user input identifying a particular one of the prefunded subaccounts SAs associated with the received prefunded primary account PA. The debit card processing module 106 is configured to receive the user input identifying the particular prefunded subaccount SA and to initiate a communication over the network interface 125 of the received primary account number PAN, the received user authorization, the received transaction amount TA, and the received particular prefunded subaccount SA.

In another embodiment of a transaction processing system 106 for use as a point of sale terminal as described herein, a point of sale terminal 106 includes a transaction interface 121 for receiving transaction information including a transaction amount TA from a purchase processing system 112. A card reader 122 is configured to read a financial card 110 having a primary account PA with a primary account number PAN associated with the financial card 110. The card reader 122 is also configured to receive a user selected subaccount indicator SAI from among a plurality of subaccount indicators SAIs each associated with a different subaccount SA within the primary account PA of the financial card 110. Of course, the card reader 122, having a user interface 124, can also be configured for receiving an input from the user that includes the subaccount indicator SAI and possibly also a Personal Identification Number (PIN). The transaction processing system 104 can also include a memory 127 and is configured with computer executable instructions for performing the transaction processing operations. A network interface 125 is configured to communicate with the financial account management system 102 for transaction authorization that includes transmitting the payment transaction PT information including the primary account number PAN, and the user selected subaccount indicator SAI to the system 102. If a PIN is also entered, the PIN can also be transmitted. The network interface 125 is also configured to receive a reply authorizing or denying or otherwise, as is described in greater detail herein.

In some embodiments, a transaction payment device 110 such as a financial card 110 can be implemented to enable the user to present the primary account PA and the subaccount indicator SAI to a transaction entity for payment of a transaction amount. Of course, in some embodiments, as described above, the user can enter the subaccount indicator (SAI) in the user interface 124 of the transaction processing system 104.

The transaction payment devices 110 can include a debit card, a charge card or a smart card. For instance, when the transaction payment device 110 or financial card (herein referred to interchangeably) is a debit card, the financial card 110 can be configured to receive an input from the user that identifies one of the various available subaccounts SAs within their primary account PA that is to be used for the payment of the particular transaction amount TA. This can be done by the user providing a single subaccount indicator SAI associated with the selected subaccount SA to the transaction processing system 104 in conjunction with the providing of the primary account number PAN. In such embodiments, and as will be described in greater detail below, the transaction processing system 104 can be configured to receive not only the primary account number PAN and other standard user and financial card data, but also the subaccount indicator SAI.

Figure 2A:
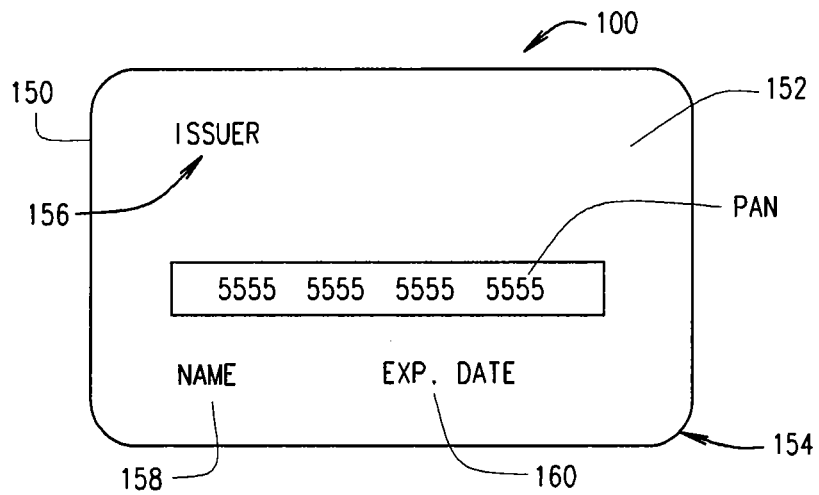
FIGS. 2A and 2B are front and rear views of a financial card for personal financial management according to one exemplary embodiment.
Figure 2B:
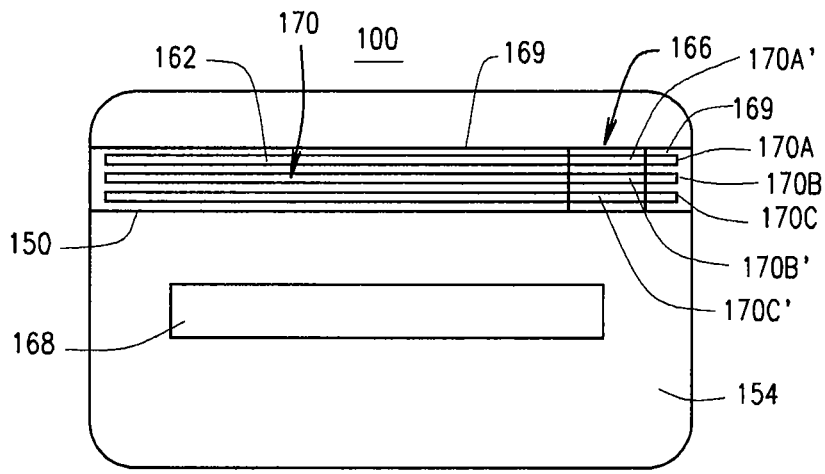

One exemplary financial card 110 is illustrated in FIGS. 2A and 2b. As shown, the card has a body 150 having a front side 152 and a back side 154, a primary account number PAN positioned on the front side 152. Additionally, the front side 152 typically also includes an issuer identification 156, a text name 158 of the user to which the card is issued, and an expiration date 160. As shown in FIG. 2B, a magnetic strip 162 is positioned on the back side 154. As shown and described in this disclosure, the magnetic strip 162 has a predefined portion 164 and a user definable portion 166. The user definable portion 166 is configurable by the user at each time of use of the financial card 110 for payment of the transaction amount from a particular user selected subaccount SA. A signature block 168 is also typically included. The user definable portion 166 can include, as will be described below, a variable field that accepts for each use, a user selected subaccount identifier SAI from among the available subaccount identifier SAs within the primary account PA as identified by the primary account number PAN for the financial card 110. To accomplish this, the card 110 includes a card user interface 126 that is described in various exemplary embodiments in FIGS. 3, 4, 5 and 6. The user interface 126 of the card 110 can be configured for receiving a user selected subaccount indicator SAI and for configuring the user definable portion to include the received user selected subaccount indicator SAI.

As described above, the transaction processing system 104 can include the card reader 122 that is configured to read the financial card 110 having the magnetic strip 162 with both the predefined portion 164 and the user definable portion 166 for obtaining the primary account number PAN and, where applicable, the user selected subaccount indicator SAI directly from the magnetic strip 162.

As one example, the system and method as described herein can utilize existing international standards for financial cards and the coding of the magnetic strip 162 wherein the transaction processing systems 104 and their card readers 112 are similarly compliant. Generally, financial cards 110 are currently based on International Standards Organization (ISO) standard ISO 7813 that defines the magnetic coding for two of the three separate magnetic tracks on the financial card, e.g., tracks 1 and 2. ISO standard 4909 provides the formatting for track 3, which is sometimes but not often used. These standards define the formatting for the three magnetic tracks 170 (shown as tracks 170A, 170B, and 170C in FIG. 2B. The capabilities of the standard formatting for these tracks 170 can be utilized to enable the system of primary account PA with subaccounts SA as described herein. Some exemplary embodiments of such will now be briefly described by way of example. Generally, any of the three tracks can be used to with the present disclosure. A brief description will address Track 1 and Track 2 as these are typically used in financial cards 110.

As defined in ISO 7813, Track 1 is generally used with the International Air Transport Association (IATA) and stores more information than Track 2 that is used with the American Banking Association (ABA). However, many financial institutions utilize Track 1 rather than Track 2, as it includes the name of the user embedded on the magnetic strip 162. However, more than one track can be encoded and used on each card 110 and can be read by the card reader 122. Track 1 includes the cardholder's name as well as primary account number PAN and other discretionary data and as described herein, can also include the user definable portion 166 that includes the subaccount identifier SAI. Track 2 is the track that is read by most automatic teller machines (ATMs) and credit card checkers, and can also include the user definable portion 166 with the subaccount identifier SAI to be used for the particular payment transaction PT. The ABA designed the Track 2 specifications and all world banks are expected to abide by its formatting. It contains the cardholder's primary account PAN, an encrypted PIN, and other discretionary data, in the predefined portion 164 and can include the subaccount identifier SAI within the user definable portion 166.

Figure 3A:
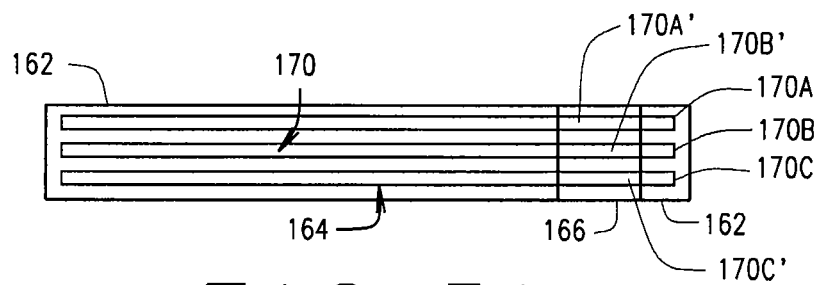
FIGS. 3A and 3B are perspective view of magnetic strips having user definable portions for a financial card according to one embodiment.
Figure 3B:
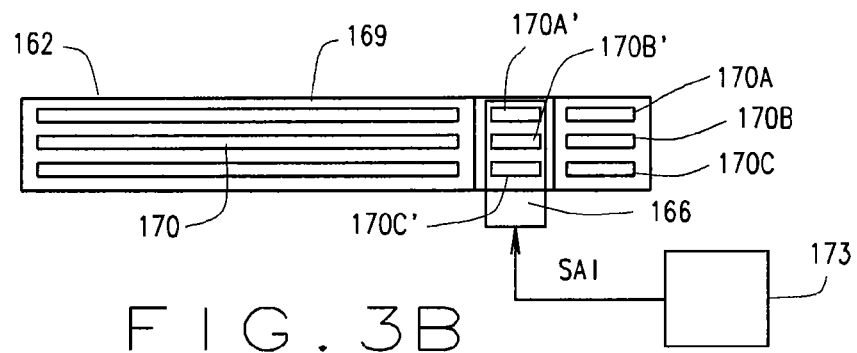

The Track 1 includes up to 79 ALPHA 7-bit (including parity) characters (alphanumeric) and is defined as a read only format. consistent with the present disclosure, Track 1 can include the following fields (in this order):

|SS|FC|PAN|Name|FS|Additional Data|ES|LRC| with each being defined as:
SS=Start Sentinel "%" (1 character)
FC=Format Code
PAN=Primary Acct. Number (maximum of 19 digits in accordance ISO 7812).
FS=Field Separator "^"
Name=26 alphanumeric characters max.
Additional Data=Expiration Date, offset, encrypted PIN, user definable portion 166 with the subaccount identifier (SAI), etc.
ES=End Sentinel "?"
LRC=Longitudinal Redundancy Check The Track 2 Layout slightly differs but is as follows:
|SS|PAN|FS|Additional Data|ES|LRC|
SS=Start Sentinel ";"
PAN=Primary Acct. Number (maximum of 19 digits)
FS=Field Separator "="
Additional Data=Expiration Date, offset, encrypted PIN, user definable portion 166 with the subaccount identifier (SAI), etc.
ES=End Sentinel "?"
LRC=Longitudinal Redundancy Check The Track 3 Layout is similar to the layouts of Tracks 1 and 2 and is almost never used. The tracks 170 for the magnetic strip 162 are shown in more detail in FIGS. 3A and 3B. As shown in FIG. 3B, the user definable portion 166 includes user definable portions of tracks 170A, 170B, and 170C, which are denoted as tracks 170A', 170B', and 170C'. FIG. 3B also illustrates that the user definable portion 166 receives an input from a user definable control module 174 for providing the subaccount indicator SAI to the user definable portions as tracks 170A', 170B', and 170C'. Of course, as will be explained in greater detail below, the user definable tracks 170A', 170B', and 170C' can also include the End Sentinel and the LRC in some embodiments.

For the particular system described herein, an explanation will be described in more detail with regard to Track 2 formatting.

As described, Track 2 (ABA) uses up to 40 binary coded digits 5-bit (including parity) characters (numeric) including for the SS, ES and LRC.

The primary account number PAN is defined by ISO 7812 and consists of a first 6 digits that are used as the Issuer Identification Number. This can include a Major Industry Identifier (MII) of up to 2 digits, which can include: Institutions other than card issuers; Airlines; Travel and entertainment; Banking/financial; Financial institutions not registered by ISO; Merchandising and banking; Petroleum; Telecommunications; and Telecommunications administrations and private operating agencies.

The Issuer Identifier Number (IIN) is the next 3 to 5 digits identify the issuer. In some cases the first digit indicates the length of the IIN or the responsibility of its assignment outside of ISO. If MII=9 then the first 3 digits are the country code (CC). The Individual Account Identification (IAI) is up to 12 digits in length. This number is assigned by the card issuing institution. A one digit Check Digit (CD) follows and is calculated using a Luhn formula for computing modulus 10 "double-add-double" check digit as is known to those skilled in the art to complete the primary account number PAN and to ensure accuracy of the number. Different companies use different codes. For example, one major credit card company has a variable number up to 16 digits while another major credit card company uses 13 or 16 digits including the check digit (CD).

The next field in the Field Separator (FS) that is 1 character in length. The next field is the country code (CC) which is 3 digits in length and is defined in ISO 3166. The next field is the Expiration Date (ED) in the 4 digit format: YYMM. Next, optional digits can include a Service Code (SC) of 3 digits. The first digit of the SC from 0 to 9 is used for interchange and technology for financial transactions including bilateral agreements with various countries.

The second digit of the SC is used for authorization processing with digits 1, 3, 5-9 being reserved for future use and 0 being for transactions that are authorized following the normal rules; 2 being for transactions are authorized by issuer and should be online, and 4 being for transactions are authorized by issuer and should be online, except under bilateral agreement.

The third digit of the SC is for the range of services and PIN requirements, including: No restrictions but a PIN is required; No restrictions; Goods and services only (no cash); ATM only and PIN required; Cash only; Goods and services only (no cash) and PIN required; No restrictions and require PIN when feasible; and Goods and services only (no cash) and require PIN when feasible. If this field in not used a Field Separator FS is used.

Next, a PIN Verification Value (PVV) field of 5 digits is used by some financial institutions. Finally, the remaining characters on Track 2 are used for Discretionary Data that includes the Additional Data such as the Expiration Date 160, an encrypted PIN, the user definable portion 166 that includes the subaccount identifier (SAI). Finally, the coding of the track 170 of magnetic strip 162 ends with a 1 character End Sentinel (ES) and a 1 character Longitude Redundancy Check (LRC). As the LRC addresses the entire coding of the track 170 that includes both the predefined portion 164 that is established by the card issuer and the user definable portion 166 that is encoded by the user with each use of the card 110 for defining the particular subaccount SA via a subaccount identifier SAI to be used for the particular transaction, the user definable portion 166 can include both the End Sentinel and the recalculated LRC that is required for processing and compliance with the ISO standards for the track formatting.

Figure 4A:
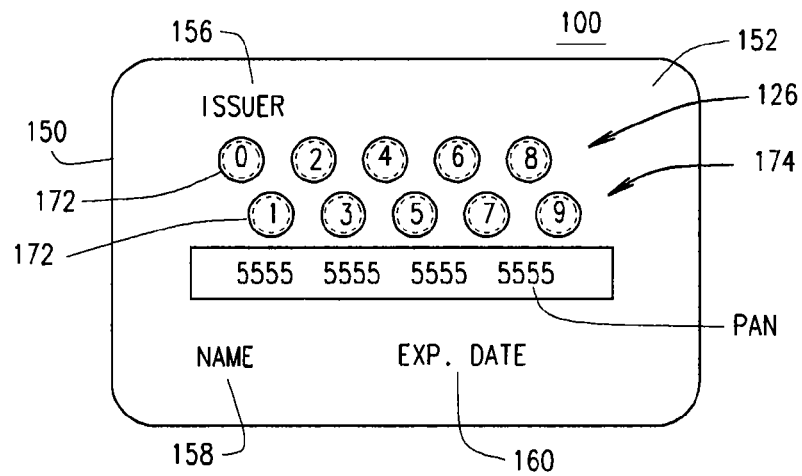
FIGS. 4A and 4B are front perspective views of two different financial cards having user interfaces with blister buttons on the front face for selecting subaccounts for a transaction according to one embodiment.
Figure 4B:
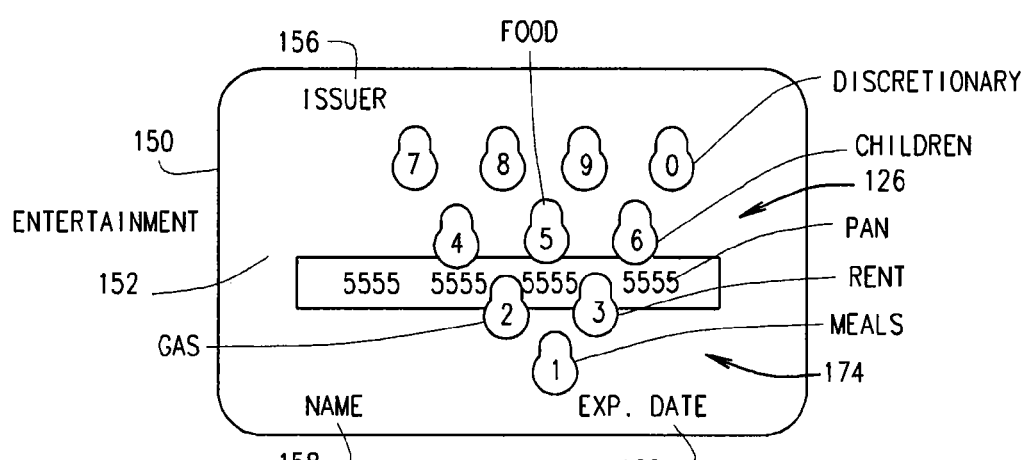

Referring now to FIGS. 4A and 4B, a financial card 110 suitable for use with the present disclosure systems and methods, can include a card user interface 126 that is comprised of blister buttons 174 positioned on one of the sides 152 or 154 (practically will be the front side 152) of the body 150 of the card 110. Each blister button 174 can be formed on a surface and within the card 110 and connected and include an electronic interface (not shown) to the user definable controller 173 for providing the selection of a particular blister button input from the user to specify the particular subaccount identifier to the user definable portion 166. The card user interface 126 receives the user selection when the user presses one of the blister buttons 174 at the time of purchase and prior to swiping the card 110 with it magnetic strip 162 in the card reader 122 of the transaction processing system 104. The controller 173 receives the user input from the selected blister button input, and creates the internal electronic circuitry, composes the magnetic coding on the user definable portion 166 to include the information on tracks 170A', 170B' and 170C' that includes the user selected subaccount identifier SAI. When the user pushes another blister button 174 of the card user interface 126, the controller 173 composes new encoding for the information on tracks 170 of the user definable portion 166 for the next payment transaction PT.

As shown in FIG. 4B, the blister buttons 174 can include indicia 176 on the card 110 that provides a textual description of the expenditure category there by enabling the user to select the subaccount SA within having to remember the subaccount identifier SAI at the time of the transaction. All the user need to do is to push the blister button 174 with the describing indicia 176 for the particular purchase. The controller 173 will handle the composing of the user definable portion as described above.

Figure 5C:
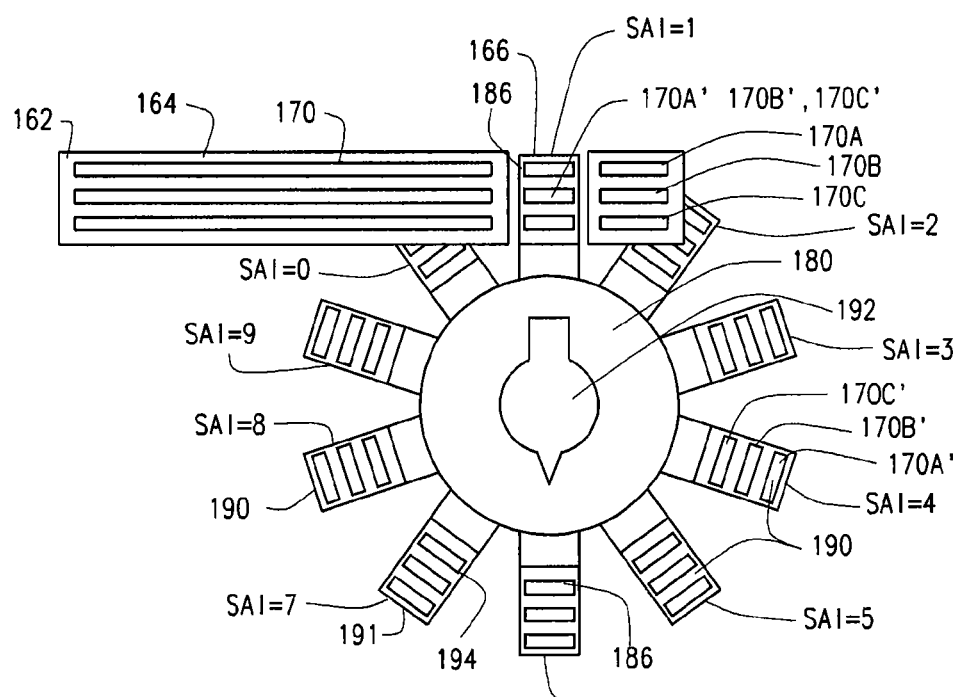

FIGS. 5A, 5B, and 5C illustrate additional embodiments of a card 110 having various user interfaces 126 and various controllers 173 for composing the user definable portion 166 of the magnetic strip 162 for use with the present disclosure.

As shown in internal portions 178 of the card 110, FIGS. 5A, 5B, and 5C shows the interworkings of the card user interface 126 that include one or more rotatable wheels 180 that rotate on a pivot 182 embedded within the body 150 of the card 110. The magnetic strip 162 include a mechanically adjustable portion 184 associated with the user definable portion 166, and in this example, includes a variety of pre-defined user selected portions 186 each of which is pre-coded with a user definable portion 166 corresponding to one of the subaccount identifier SAI as selected by the user by rotation of the wheels 180. One of the wheels 180 can be a user input wheel 180A that is the card user interface 126 and that is rotatable by the user to select one of the subaccount indicators SAIs. By so operating the user input wheel 180A, the corresponding predefined user selected portion 186 is moved into the position of the user definable portion 166 of the magnetic strip 162 so that the appropriate tracks 170A', 170B', and 170C', are positioned for reading of the user selected subaccount identifier SAI. FIG. 5B illustrates embodiments wherein there are multiple wheels 180, each being gears and coupled together for movement of the predefined portions 164 of the magnetic strip 162.

FIG. 5C illustrates another embodiment. As shown, the wheel 180 has spaced apart magnetic sections 190 each having an end 191 containing a different predefined user definable portion 186 having the user definable tracks 170A', 170B', and 170C', that can be positioned with the magnetic strip 162 and aligned with predefined portion 164 and its predefined tracks 170A, 170B, and 170C, for providing the user definable portion 166 with the user selected subaccount identifier SAI. Each spaced apart magnetic section 190 can be, for example, a paddle having the magnetic section 190 positioned on the free end 191. The magnetic section 190 includes the user definable portion 166 each having one of the subaccount indicators SAIs and possibly can also include any necessary sentinel character SC and the required longitude redundancy check LRC character.

The body 150 of the card 110 can include the wheel 180 that has an aperture 192 that is dimensioned for receiving a key (not shown) or other mechanism for enabling the user to rotate the wheel 180, such as with a finger or finger nail of the user. While not shown, the wheel 180 can be restricted in various manners from arbitrarily moving or rotating without user input, such as known to those skilled in the art. The wheel 180 can be selectively held in place after positioning by the user either by friction or possibly a selective or limited locking portion or stop mechanism that can include a ratchet or similar device. In this manner, the wheel 180 is held in place until the user intentionally makes a change to the subaccount to be used for the next transaction. Additionally, each spaced apart magnetic section 190 can include indicia 194 that can be visible to the user for aiding in selection of the subaccount SA for the particular payment transaction PT.

Figure 6:
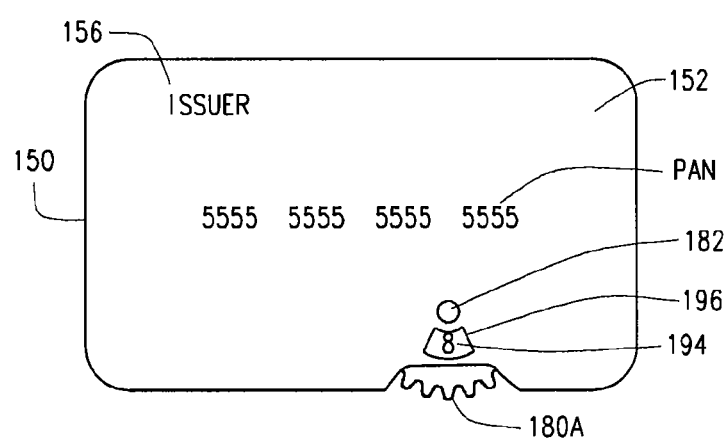
FIG. 6 is a front view of a financial card having a user interface with a user operable wheel for selecting a subaccount for a transaction according to another embodiment.

As shown in FIG. 6, a display window 196 can be positioned on the front 152 of the card 110 proximate to one of the wheels 180 such that indicia 194 on one of the wheels 180 is visible to the user of the card 110 at the time of each use. The indicia 194 can be the subaccount indicator SAI or can be a textual description or a symbol or drawing indicating the subject matter of the subaccount. This can aid the user in selecting the subaccount SA at the time of use of the card 110 and therefore in managing their personal financials.

In other embodiments while not shown in the figures, the financial card 110 as described herein is a smart card. In such embodiments, the card reader 122 is configured to receive from the smart card 110 the primary account number PAN and the user selected subaccount indicator SAI. In one such exemplary smart card embodiment, a financial transaction card 110 includes a body 150 and an integrated microprocessor (not shown but known to those skilled in the art) and memory including a primary account number PAN having a plurality of subaccounts SAs, each subaccount SA having a different subaccount indicator SAI. A user interface 124 is configured to receive a user selection of one of the subaccount indicators SAIs and providing the user selected subaccount indicator SAI to the integrated microprocessor. An output interface (not shown but know to those skilled in the art) is configured to provide the primary account number PAN and the user selected subaccount indicator SAI to the transaction processing system 104 that is configured for processing smart cards for user transactions.

It should also be understood that while the exemplary embodiments as described herein relate to prefunded primary account PA and subaccounts SAs, the systems and methods hereof can also be suitable for use with credit card payment and processing systems 104. The primary difference in such embodiments is that there is not necessarily a check on the amount of prefunded amounts in a subaccount. However, as described herein, the user can establish subaccounts limits within his primary credit card account or credit card limit, and in such a manner, can personally manage his credit and/or expenditures. This can also be utilized to aid in the user allocating and managing his credit expenditures at least with regard to subdividing his monthly statements into subtotals or allocations on his monthly billing statements.

The transaction amount for a purchase by the user is determined at the point of sale that can include an on-line transaction processing system 108 or third party agent who enters the payment transaction PT information. The on-line transaction processing system 108 includes a communication interface 132 that can be a telephone line or a web portal or webpage. The user provide the primary account PA, and the subaccount indicator SAI to complete the payment transaction PT and the payment of the transaction amount TA from the user selected subaccount SA. As described above, the user can provide the subaccount indicator SAI either verbally, or via the communication interface 132 such as an entry into a webpage. Of course other user information can also be provided such as may be required for the particular application. The on-line processing system 108 processes the payment transaction PT in a similar manner as described above, including the provision of the subaccount identifier SAI as provided by the user for use with the particular payment transaction PT.

The transaction processing system 104 is configured to receive a personal identification number having at least one variable character selected by the user from among a plurality of available variable characters each of which is associated with a different subaccount. The financial account management system is configured to receive the personal identification number (PIN) from the transaction processing system 104 to verify the payment of the transaction amount from the primary account PA and from the subaccount responsive to the received personal identification number.

The herein the transaction processing system 104 is an online internet-based payment transaction system having a hosted user interface configured for prompting the user to input both the primary account PA and the particular subaccount for payment of the transaction amount.

The transaction processing system 104 is configured to receive a personal identification number at the time of the payment transaction PT, the personal identification number having two portions, a fixed predefined portion and a user definable portion, the user definable portion being user defined at the time of the transaction for specifying one of the available subaccount indicators SAIs.

The transaction processing system 104 is configured to receive the subaccount indicator SAI, an associated end sentinel character, and an associated longitude redundancy check (LRC) character.

As described, the various user financial cards 110 for personal financial management can include using a debit card. To accomplish this, the use would open a debit card primary account PA having a primary account number PAN with a financial institution. The financial institution would then issue to the use. The financial institution would issue a suitable financial card 110 to the user. At the same time, the user could establish a plurality of subaccounts SAs within the primary account PA with each being uniquely identified with a separate subaccount indicator SAI. The client and/or financial institution would then provide for a prefunding of each of the subaccounts SAs and maintain such prefunding on a monthly or bi-monthly pre-funded amount. The method also includes selecting one of the subaccount indicators SAIs for use as payment of a transaction amount TA. A payment of a transaction amount TA is initiated from the primary account PA using the debit card 110 along with the user selected subaccount indicator SAI.

Figure 7:
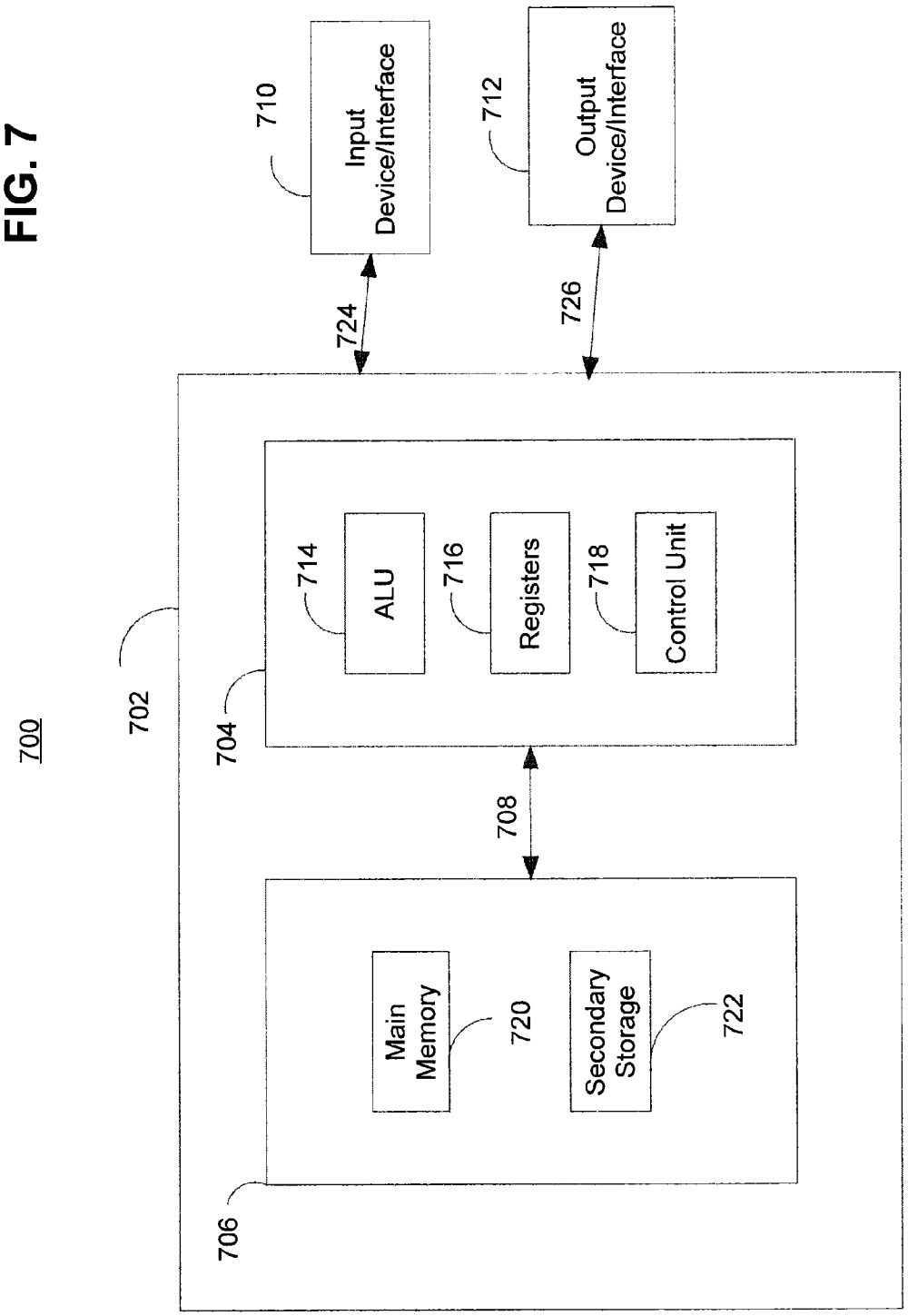
FIG. 7 is a block diagram of a computer system suitable for use with a transaction processing system and/or financial account management system according to various embodiments of this disclosure.

Referring to FIG. 7, an operating environment for an illustrated embodiment of the transaction processing system 104 and/or the financial account management system 102 can include, in one embodiment, a computer system 700 with a computer 702 that comprises at least one high speed processing unit (CPU) 704, in conjunction with a memory system 706 interconnected with at least one bus structure 708, an input device 710, and an output device 712. These elements can be interconnected by at least one bus structure 712.

The illustrated CPU 704 is of familiar design and includes an arithmetic logic unit (ALU) 714 for performing computations, a collection of registers 714 for temporary storage of data and instructions, and a control unit 716 for controlling operation of the system 700. Any of a variety of processors, including at least those from Digital Equipment, Sun, MIPS, Motorola, NEC, Intel, Cyrix, AMD, HP, and Nexgen, are equally preferred for the CPU X. The illustrated exemplary embodiment operates on an operating system designed to be portable to any of these processing platforms.

The memory system 706 generally includes high-speed main memory 720 in the form of a medium such as random access memory (RAM) and read only memory (ROM) semiconductor devices, and secondary storage 722 in the form of long term storage mediums such as floppy disks, hard disks, tape, CD-ROM, flash memory, etc. and other devices that store data using electrical, magnetic, optical or other recording media. The main memory 720 also can include video display memory for displaying images through a display device. Those skilled in the art will recognize that the memory system 706 can comprise a variety of alternative components having a variety of storage capacities.

The input device 710 and output device 712 are also familiar. The input device 710 can comprise a keyboard, a mouse, a physical transducer (e.g. a microphone), etc. and is interconnected to the computer 702 via an input interface 724. The output device 712 can comprise a display, a printer, a transducer (e.g. a speaker), etc., and be interconnected to the computer 702 via an output interface 726. Some devices, such as a network adapter or a modem, can be used as input and/or output devices.

As is familiar to those skilled in the art, the computer system 700 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 706.

In accordance with the practices of persons skilled in the art of computer programming, the present disclosure is described below with reference to symbolic representations of operations that are performed by the computer system 700. Such operations are sometimes referred to as being computer-executed. It will be appreciated that the operations which are symbolically represented include the manipulation by the CPU 704 of electrical signals representing data bits and the maintenance of data bits at memory locations in the memory system 706, as well as other processing of signals. The memory locations where data bits are maintained are physical locations that have particular electrical, magnetic, or optical properties corresponding to the data bits. The system or components thereof as described herein can be implemented in a program or programs, comprising a series of instructions stored on a computer-readable medium. The computer-readable medium can be any of the devices, or a combination of the devices, described above in connection with the memory system 706.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A financial system for processing financial purchase transaction payments with user oriented personal financial management support comprising:
   a server having a processor, a network interface, a non-transitory memory and computer executable instructions including a database, and a network interface;
   the network interface communicatively interfacing with a remote financial purchase transaction processing system over a communication network for receiving a primary account number, a financial purchase transaction amount, and a subaccount indicator;
   the database including a plurality of primary accounts each having a plurality of subaccounts each associated with a subaccount indicator and each having a funding level;
   computer executable instructions for performing the method of:
   establishing in the database a primary account for the user having a primary account number for financial purchase transactions;
   establishing in the database a plurality of subaccounts each with a subaccount indicator within the primary account and having a subaccount funding level for financial purchase transactions;
   receiving a funding level from the user located at a remote financial purchase processing system for each of the subaccounts and indicating in the database the receipt of such funding level in each of the subaccounts of the primary account for financial purchase transactions;
   receiving over the network interface a financial purchase transactions payment request from the financial purchase transaction processing system for payment authorization of a financial purchase transaction payment associated with an activity of the user associated with the financial purchase transaction processing system, the financial purchase transaction payment request including a financial purchase transaction amount, the primary account number, and a user selected subaccount indicator, wherein the received user selected subaccount indicator in the received payment request is one of the plurality of subaccount indicators associated with one of the plurality of subaccounts within the primary account associated with the received primary account number;
   verifying the received financial purchase transaction amount is within the received funding level for the subaccount associated with the received user selected subaccount indicator contained within the received payment request in near real time; and
   transmitting over the network interface a financial purchase transaction authorization to the financial purchase transaction processing system in response in near real time to a positive verification that the received financial purchase transaction amount is within the funding level of the subaccount associated with the received subaccount indicator.

2. The system of claim 1 wherein the computer executable instructions include processes for further performing the method further comprising:

transmitting over the network interface a lack of funds indicator to the transaction processing system in response to a negative verification that the received transaction amount is greater than the funding level of the subaccount associated with the received subaccount indicator; and transmitting over the network interface to the transaction processing system a request for an alternative subaccount to be selected by the user for processing of the payment of the transaction amount.

3. The system of claim 1 wherein the computer executable instructions include processes for further performing the method further comprising:

receiving over the network interface an allocation instruction from the user; and reallocating a funding amount to the received subaccount associated with the received subaccount indicator from a different funding level of a different subaccount to the funding level of the associated subaccount with the received transaction payment amount.

4. The system of claim 1 wherein the computer executable instructions include processes for further performing the method further comprising:

receiving over the network interface a discretionary user funding level; and allocating the discretionary funding level to one or more of the subaccounts.

5. The system of claim 1 wherein the computer executable instructions include processes for further performing the method further comprising:

receiving over the network interface a user allocation instruction, wherein the allocating is responsive to the instruction.

6. The system of claim 1 wherein the computer executable instructions include processes for further performing the method further comprising:

receiving a specification of a subaccount label for each of the subaccounts within the primary account and for establishing the funding levels for each of the subaccounts within the primary account as a function of the subaccount label associated with each.

7. The system of claim 1 wherein the subaccount indicator is a single digit between 0 and 9.

8. The system of claim 1 wherein the subaccount indicator is a single digit between 0 and 9.

9. The system of claim 1 wherein the financial purchase transaction processing system located remote from the server is a point of sale transaction processing system.

10. The system of claim 1 wherein the financial purchase transaction processing system is a credit card or debit card transaction processing system.

11. A method of providing personal financial management to a user for making payment towards a purchase using a remotely located financial management system comprising:

the remotely located financial management system having a processor, a network interface, a non-transitory memory and computer executable instructions including a database and for performing the processes of:

establishing in the database a primary account for the user having a primary account number for financial purchase transactions;

establishing in the database a plurality of subaccounts each with a subaccount indicator within the primary account and having a subaccount funding level for the subaccount;

receiving an amount for each subaccount funding level from the user for each of the subaccounts and indicating in the database the amount of such funding level in each of the subaccounts of the primary account;

receiving over the network interface from a transaction processing system located remote from the server and at the location of the user a transaction payment request for authorization of a transaction payment associated with an activity of the user associated with the transaction processing system, the financial purchase transactions payment request including a transaction amount, the primary account number, and a user selected subaccount indicator, wherein the received user selected subaccount indicator in the received payment request is one of the plurality of subaccount indicators associated with one of the plurality of subaccounts within the primary account associated with the received primary account number;

verifying the received transaction amount is within the received funding level for the subaccount associated with the received user selected subaccount indicator contained within the received payment request in near real time; and transmitting over the network interface a transaction authorization to the transaction processing system in response in near real time to a positive verification that the received transaction amount is within the funding level of the subaccount associated with the received subaccount indicator.

12. The method of claim 11 further comprising:

transmitting over the network interface a lack of funds indicator to the transaction processing system in response to a negative verification that the received transaction amount is greater than the funding level of the subaccount associated with the received subaccount indicator; and transmitting over the network interface to the transaction processing system a request for an alternative subaccount to be selected by the user for processing of the payment of the transaction amount.

13. The method of claim 11 further comprising:

receiving over the network interface an allocation instruction from the user; and reallocating a funding level to the received subaccount associated with the received subaccount indicator from a different funding level of a different subaccount to the funding level of the associated subaccount with the received transaction payment amount.

14. The method of claim 11 further comprising:

receiving over the network interface a discretionary user funding level; and allocating the discretionary funding level to one or more of the subaccounts.

15. The method of claim 11 further comprising:

receiving over the network interface a user allocation instruction, wherein the allocating is responsive to the instruction.

16. The method of claim 11 further comprising:

receiving a specification of a subaccount label for each of the subaccounts within the primary account and for establishing the funding levels for each of the subaccounts within the primary account as a function of the subaccount label associated with each.

17. The method of claim 11 wherein the subaccount indicator is a single digit between 0 and 9.

18. The method of claim 11 wherein the subaccount indicator is a single digit between 0 and 9.

19. The method of claim 11 wherein the financial purchase transaction processing system located remote from the server is a point of sale transaction processing system.

20. The method of claim 11 wherein the financial purchase transaction processing system is a credit card or debit card transaction processing system.

* * * * *